March 25, 1941.  J. D. HUGGINS, JR  2,235,930
PNEUMATIC TIRE AIR PRESSURE INDICATING MEANS
Filed Sept. 23, 1938  2 Sheets-Sheet 2
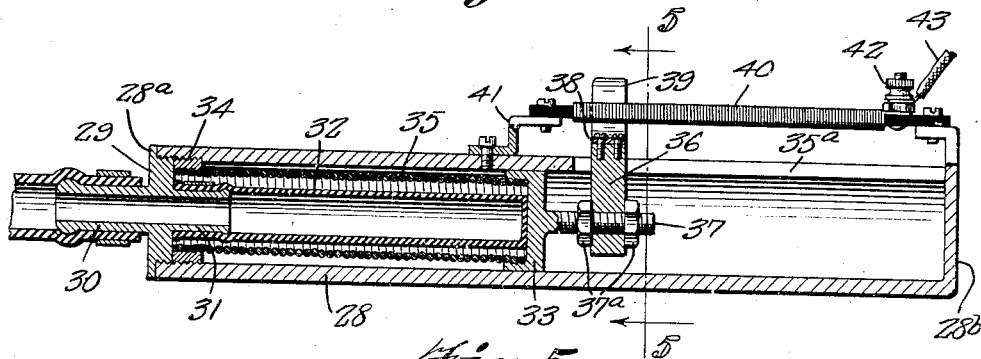
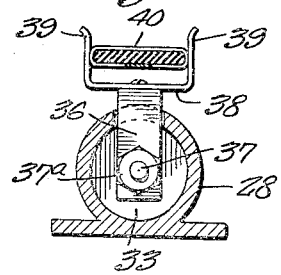
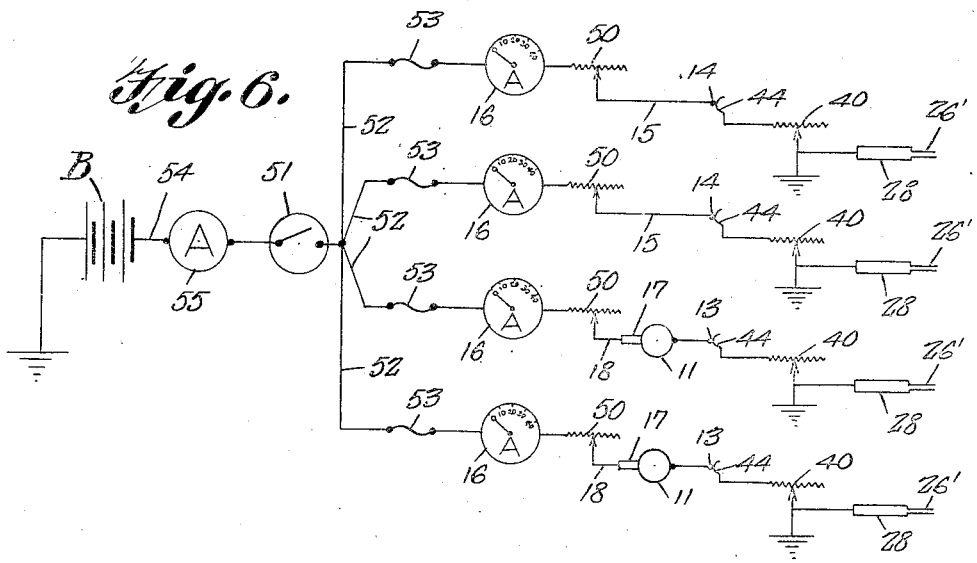
James D. Huggins, Jr.,
INVENTOR
BY Victor J. Evans & Co.
ATTORNEYS
WITNESS Patented Mar. 25, 1941

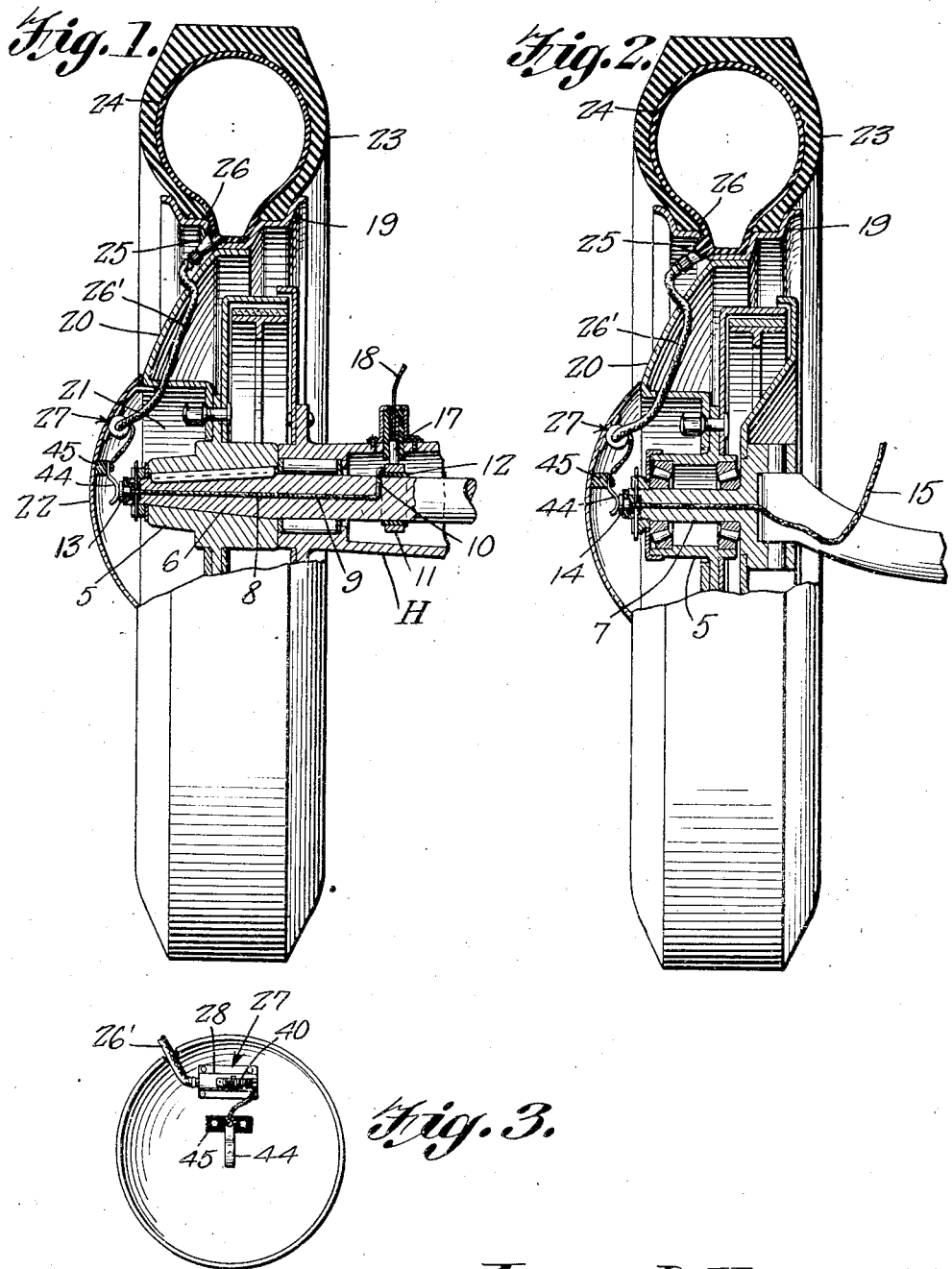

2,235,930

UNITED STATES PATENT OFFICE 2,235,930

PNEUMATIC TIRE AIR PRESSURE INDICATING MEANS

James D. Huggins, Jr., Boiling Springs, N. C.

Application September 23, 1938, Serial No. 231,438

1 Claim. (Cl. 201—48)

My invention relates to improvements in air pressure indicating means adapted to be installed on an automobile or other vehicle having its wheels equipped with pneumatic tires.

One of the principal objects of my invention is to provide an air pressure indicating means so constructed and arranged, when installed on a vehicle equipped with pneumatic tires, as to indicate, through the medium of a set of dials, the pressure of air in the individual tires, thus enabling the operator of the vehicle to easily determine whether said tires are properly inflated.

Another object of my invention is to provide air pressure indicating means of the character described connected to a common source of electric energy, for instance the battery of the vehicle, for actuating the various dials in a manner whereby the pressure in the individual tires is indicated.

A further object of my invention is to provide a device of the character described which may be readily installed upon motor vehicles having front and rear wheels of the conventional construction.

A still further object of my invention is to provide a device of the character described which is simple in construction, durable in use, efficient in operation and economical in manufacture.

Other objects and advantages will be apparent from the following description, appended claim and annexed drawings.

Referring to the drawings wherein like reference characters designate like parts throughout the several views:

Figure 1 is a transverse sectional view of a rear wheel of a motor vehicle, partly in elevation, illustrating my invention as applied thereto.

Figure 2 is a view similar to Figure 1, illustrating my invention as applied to the front wheel of a motor vehicle.

Figure 3 is a rear elevation of the hub cap employed, illustrating my pressure actuated device attached thereto.

Figure 4 is a detail longitudinal section view of the pressure actuated device.

Figure 5 is a sectional view taken on the line 5—5 of Figure 4.

Figure 6 is a diagrammatic view of the electrical circuit employed.

In practicing my invention, I provide a motor vehicle wheel comprising a hub 5, which, in the instances of a rear wheel, is keyed to an axle spindle 6 for rotation therewith as illustrated in Figure 1 and in the instance of a front wheel rotatably mounted on the axle spindle 7 for rotation relative thereto as clearly illustrated in Figure 2.

The axle spindle 6 is fashioned with an axially extending bore 8 in which is mounted an electric wire 9 having a cover of insulating material and the rear end of said bore 8 communicates with an outwardly extending aperture 10 through which the rear end of the wire 9 extends and is connected to a rotary contact ring 11 insulated from the axle spindle 6 by a body of insulating material 12 interposed therebetween as clearly illustrated in Figure 1. The front end of the axle spindle 6 is fashioned with a socket having secured therein a contact member 13 insulated from said axle and connected to the outer end of the wire 9.

The outer end of the axle spindle 7 is likewise provided with a contact member 14 connected to the outer end of a wire 15 extending therethrough and connected to a terminal of one of a set of dials 16 hereinafter more fully described. Adjacent the rotary contact ring 11, the stationary axle housing H surrounding the spindle 6 has mounted thereon and insulated therefrom, a spring pressed plunger 17, one end of which has wiping engagement with the ring 11 and the opposite end connected to one end of a lead wire 18, the opposite end of said lead wire being connected to a terminal of another of said dials 16.

Each of the motor vehicle wheels is equipped with rims 19 connected to the hubs 5 by means of disks 20 formed with recesses 21 adjacent said hubs and closed by hub caps 22. The rims 19 are provided with tire casings 23 equipped with inner tubes 24 which have secured thereto connections 25 extending through apertures 26 in the outer walls of said rims. The outer ends of the air connections 25 have threaded thereon the upper ends of flexible conduits 26′, the lower ends of which are connected to pressure responsive and actuated devices 27, one of which is secured to the inner face of each of the hub caps 22 as clearly illustrated in Figure 3.

Inasmuch as each of the devices 27 are of a like construction, a detailed description of one will suffice. The device 27 comprises an elongated cylinder 28 having open and closed ends 28a and 28b respectively. The open end 28a is threaded an appreciable distance within the bore 28c thereof. Threaded in said open end 28a is a nipple 29 having inner and outer reduced barrels 31 and 30 respectively. The outer barrel 30 has clamped thereon the lower end of the conduit 28 and the inner barrel 31 has secured thereabout the outwardly extending end of a rubber tube 32, the inner end of which is closed and normally engages a guide member or head 33 reciprocally mounted in the bore of the cylinder 28 and said guide head 33 is connected to a ring 34 threaded in said bore adjacent the nipple 29 by means of a coil spring 35 surrounding said tube 32.

Obviously, air introduced into the tube 32 through the conduit 20 connected to the inner tube 26 serves to expand the tube 32 and actuate the head 33 in a direction away from the open end of the cylinder. The tension of the spring 35 is sufficient to normally maintain the head 33 in a predetermined location in said cylinder relative to a predetermined amount of air pressure in the tube 32.

One section of the cylinder 28 adjacent the closed end, is fashioned with a longitudinally extending slot 35a through which extends an arm 36, the lower end of which is connected to the head 33 by means of an axially extending bolt 37 and adjusting nuts 37a. The upper end of the arm 36 has mounted thereon a yoke 38 provided with spaced fingers 39 engaging the sides of an elongated resistance unit 40 overlying the slot 35a and said resistance unit is mounted on a pair of arms 41 carried on the cylinder 28, it being understood that said resistance unit is insulated from the arm 41 and is provided with a binding post 42 connected to one end of an electric lead wire 43, the opposite end of which is connected to a finger 44 secured to a block of insulating material 45 mounted on the hub cap 22 and said finger resiliently engages the contact member 13 or 14 as the case may be.

In operation, each of the wheels of the motor vehicle are equipped with my invention in the foregoing described manner and the inner tubes of the tires of said wheels are inflated to a desired pressure. The indicators 16 are in the form of ammeters and are responsive to the adjustment of the fingers 39 relative to the resistance units 40 carried on the cylinders 28. Obviously, when one of the inner tubes becomes deflated or slightly deflated the tube 32 connected thereto by the conduit 26' will likewise become deflated and cause the head 33 to move towards the ring 34 by the action of the spring 35 thereby increasing the resistance in the unit 40 through the medium of the fingers 39 which are grounded to one side of the vehicle battery B through the medium of the hub cap, connected parts and the frame of the vehicle. When the resistance in the unit 40 is thus increased, the same will be indicated on the ammeters 16 connected in circuit therewith through the medium of the wiring heretofore described and thereby enabling an operator of the motor vehicle to determine the inflated condition of each of the inner tubes in the various tires. It is understood that a reverse movement of the head 33 will be had should the tires of one of them be over-inflated through the medium of the tube 32 connected to the respective inner tube.

In order to compensate for variations in the battery, adjustable resistance units 50 are interposed within the lead wires 15 and 16 respectively. The opposite terminal of the ammeters 16 are connected to one pole of an ignition switch 51 through lead wires 52 and said lead wires 52 have interposed therein fuses 53. The opposite pole of the ignition switch 51 is connected by a lead wire 54 to the positive side of the battery B and said wire 54 has interposed therein a main ammeter 55 of an ordinary construction for denoting the condition of all of the circuits. The nuts 37 may be adjusted by inserting a wrench or other tool through the slot 35a, although the cylinder 28 may be provided with another opening for this purpose.

What I claim is:

In combination, an electric circuit having an electrically sensitive tire pressure indicating means interposed therein, a resistance in said circuit and including a wiper contact electrically engaging said resistance, and a tire pressure operated device interposed in said circuit for actuating said contact and comprising a cylinder provided with a bore, a member slidably mounted in said bore, a spring electrically connecting said member to said cylinder and for moving said member in one direction, an inflatable tube disposed within said spring and connected to said cylinder and engaging said member for moving the latter in an opposite direction upon inflation of said member by pressure from said tire, and a circuit closing arm carried by said member and connected to said contact for shifting the latter relative to the resistance in response to pressure in the tire.

JAMES D. HUGGINS, Jr.